Oct. 13, 1964  T. D. JORGENSEN  3,152,741
INTERMITTENT FEED MECHANISM
Filed Jan. 31, 1962  2 Sheets-Sheet 2

INVENTOR.
THOMAS D. JORGENSEN
BY
ATTORNEY

United States Patent Office 3,152,741
Patented Oct. 13, 1964

3,152,741
INTERMITTENT FEED MECHANISM
Thomas D. Jorgensen, Addison, Ill., assignor to Graflex, Inc., Rochester, N.Y., a corporation of Delaware
Filed Jan. 31, 1962, Ser. No. 170,277
10 Claims. (Cl. 226—65)

The present invention relates to intermittent feed mechanisms and more particularly to intermittent feed mechanisms for motion picture projectors.

In order to operate satisfactorily, the intermittent feed mechanism of a motion picture projector must position the successive frames of the film precisely in the optical aperture of the film guide. Because of manufacturing tolerances, some means must be provided therefore for adjusting the intermittent feed mechanism of the projector, after assembly in the projector, to achieve the required precision.

A primary object of the present invention is to provide an intermittent feed mechanism for a motion picture projector which will permit of readily compensating for manufacturing tolerances in the feed mechanism and in the associated parts of the projector.

Another object of the invention is to provide an intermittent feed mechanism for motion picture projectors which is relatively simple and which can be manufactured by relatively inexpensive machine tool operations.

Another object of the invention is to provide an intermittent feed mechanism of the type described which can readily be adjusted by untrained personnel to eliminate close piece-part tolerances in the manufacture of the various parts.

Other objects of the invention will be apparent hereinafter from the description and from the recital of the appended claims particularly when read in conjunction with the accompanying drawings.

Figure 1:
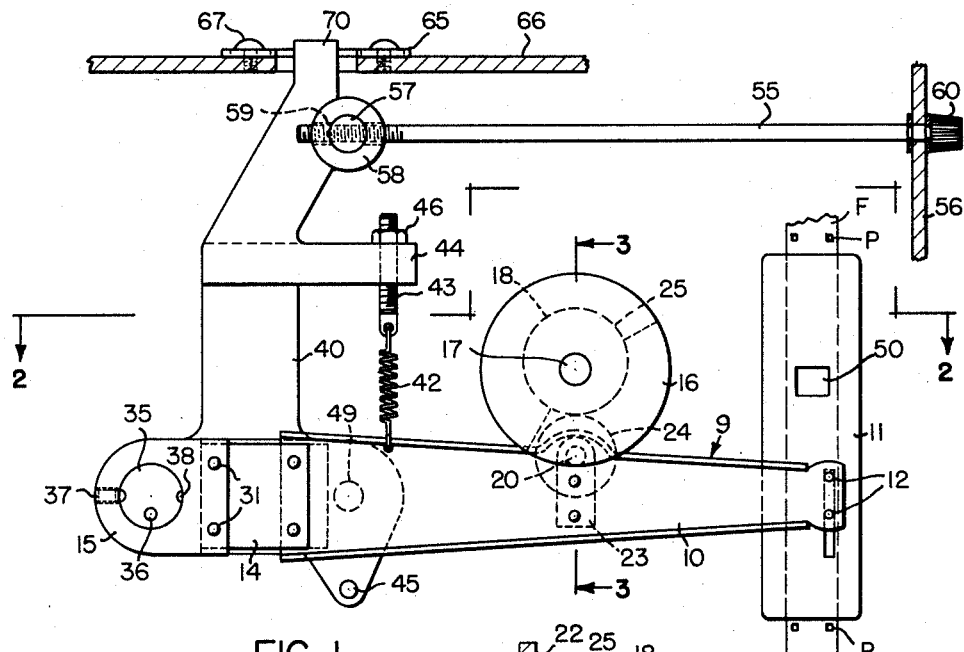
FIG. 1 is a fragmentary view showing an intermittent film feed mechanism built according to one embodiment of this invention for a motion picture projector.

In the mechanism illustrated in the drawings, the claw arm is mounted both for swinging movement vertically and for swinging movement horizontally. The swinging movements are produced by a cam which has two cam surfaces, one of the cam surfaces being operative through one follower to effect up and down motion of the claw arm; and the other of the cam surfaces being operative through another follower to effect in and out motion of the claw arm. The claw arm has claw pins on it at its outer end. When the arm is swung inwardly these pins engage in perforations along one edge of the film. When the claw arm is swung vertically in one direction feed of the film is effected. At the end of the feed stroke, the claw arm is swung outwardly to disengage the claw pins from the film. Then the claw arm is swung vertically in the opposite direction from its film feed movement and while the claw pins are disengaged, to return the claw arm to starting position, ready to begin a new cycle. For its in and out motions the claw arm is made in two parts, and the part, which carries the claw pins, is connected by a hinge plate to the other part. The up and down swinging motions of the claw arm are produced by swinging the latter part on a pivot pin, which is carried by a framing arm. The second part of the claw arm carries a rotatably adjustable bushing that has an eccentric hole in it by means of which the bushing is mounted on the pivot pin. The pivot pin is disposed eccentrically on a disc that is rotatably adjustable on the framing arm. The framing arm is mounted in the projector for pivotal adjustment about an axis offset from but parallel to the axis of the pivot pin. By adjusting the bushing and disc together or separately the distance between the pivot of the claw arm and the actuating cam can be adjusted to change the length of the lever arm of the claw mechanism thereby correspondingly to change the film-moving throw of the claw pins. By adjusting the framing arm on its pivot the vertical position of the claw pins can be adjusted to center a frame of the film in the optical aperture. By rotatably adjusting the pivot pin disc in the framing arm, a horizontal change in position of the claw arm can be made without changing the up and down stroke of the claw pins.

Figure 2:
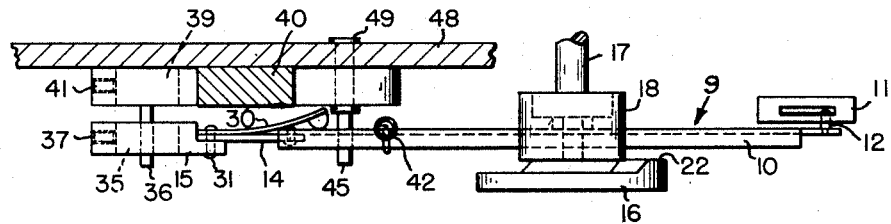
FIG. 2 is a section through this mechanism taken on the line 2—2 of FIG. 1 looking in the direction of the arrows.

Referring now to the drawings by numerals of reference, 9 denotes the claw arm; and 11 designates a film guide through which the film F, which is to be projected, is fed. The claw arm is made in two parts, 10 and 15, hingedly connected together by a flexible metal hinge plate 14. The claw arm in its normal position, shown in FIGS. 1 and 2, lies in a plane substantially parallel to the plane of the film F in the guide 11. At its outer end the claw arm has two claw pins 12 riveted in it. These constitute claw fingers for engaging in the perforations P of the film to advance the film.

Figure 3:
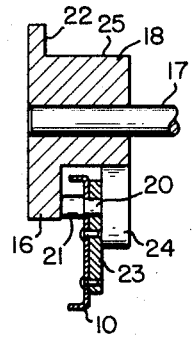
FIG. 3 is a fragmentary section on the line 3—3 of FIG. 1 looking in the direction of the arrows.

The portion 10 of the claw arm swings on hinge plate 14 to move the claw pins 12 into and out of engagement with the film; and it pivots up and down about another axis, as will be described further hereinafter, to effect advance of the film and return of the claw arm to starting position. For these purposes, the rotary cam 16 is provided. This cam is fixedly secured to a shaft 17. It has a face cam surface 22 and an eccentric portion 18. The portion 10 of the claw arm carries a stud 20 which has an enlarged head 21 (FIG. 3) at one end that engages against the face track 22 of the cam 16. The stud 20 carries a roller or disc 24 at its other end which rides on the periphery 25 of the eccentric portion 18 of the cam. The stud 20 is secured in claw arm 10 and in a reinforcing strap or plate 23 that is riveted to the claw arm. The head 21 of the stud 20 is held constantly in engagement with the face track 22 of cam 16, and the claw pins 12 are constantly urged toward disengaged position, by a leaf spring 30 which is secured to the portion 15 of the claw arm by the same rivets 31 as secure the hinge plate 14 to portion 15.

Rotatably adjustable in the portion 15 of the claw arm is a pivot bushing 35 which is mounted to rotate on a stud 36. This bushing is adapted to be held against rotation in the supporting block 15 by a setscrew 37. It is provided with two diametrally opposed notches 38 on its periphery by means of which a wrench can be applied to it to adjust it rotatably on the stud 36. Stud 36 constitutes a pivot for the claw arm 9 and is mounted eccentrically on a cylindrical disc 39 which is rotatably adjustable in a framing arm 40. The disc 39 can be secured in any adjusted rotary position by a setscrew 41 which threads into the framing arm.

The claw arm 9 is constantly urged in one direction about the pivot 36 by a coil spring 42 which is connected at one end to the claw arm, and which is connected at its opposite end to a stud 43 which threads adjustably into a lateral projection 44 of the framing arm. A pin 45, which is secured in the framing arm, and which projects laterally therefrom, serves to limit the clockwise movement of the claw arm 9, to prevent disengagement of the followers 20 and 24 from the cam tracks 22 and 25, respectively, in case of accidental overstroke of the claw arm from an outside source. Nut 46, which threads on the stud 43, permits of adjustment of the tension of the spring 42.

The framing arm 40 is mounted for pivotal adjustment on a wall 48 of the projector by means of a stud 49. Adjustment of the framing arm on its pivot permits of centering a frame of the film in the optical aperture 50 of the film guide 11. This adjustment may be effected by rotation of the framing rod 55, which is rotatably mounted in a wall 56 of the projector casing. The rod 55 threads into a cylindrical pivot member 57 which is pivotally movable in the boss 58 formed on the framing arm. The boss is formed with a diametral hole 59 through which the rod 55 extends into the pivot member 57. This hole is of sufficiently larger diameter than the diameter of the rod so as to permit the desired pivotal movement of the framing arm upon rotation of the rod, without interference between the rod and the boss. A knurled knob 60 is secured to the outer end of the rod 55 for rotating it to effect adjustment of the framing arm.

Figure 4:
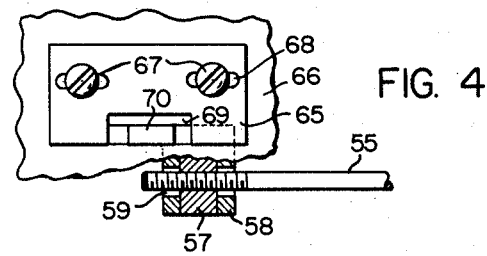
FIG. 4 is a fragmentary plan view of parts shown in FIG. 1, showing the framing arm and framing rod fragmentarily, and the plate for limiting adjustment of the framing arm.

To limit swinging movement of the framing arm a plate 65 is mounted on a wall 66 of the projector. This plate is adjustably secured to the wall 66 by screws 67 which pass through elongate slots 68 (FIG. 4) in the plate 65 and which thread into the wall 66. The plate 65 is recessed at one side to provide a notch 69 in which a projection or finger 70 at the top of the framing arm can move. The framing arm is limited in its movement by engagement of finger 70 with the opposite side walls of this notch 69.

Shaft 17 is adapted to be driven continuously, during operation of the motion picture projector, from the drive motor for the projector.

Figure 5:
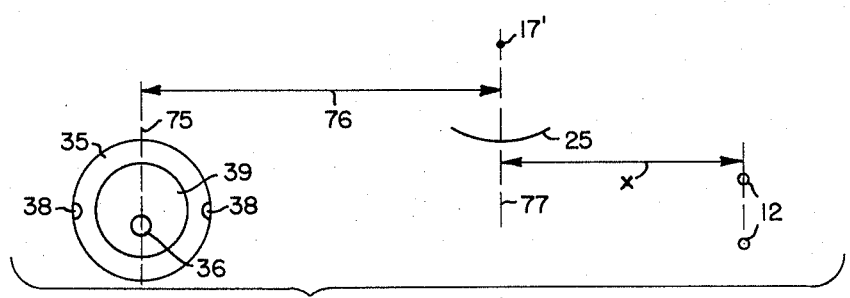
FIGS. 5 to 8 inclusive are diagrammatic views illustrating the several ways in which adjustment of the mechanism may be made to change the throw of the claw arm.
Figure 6:
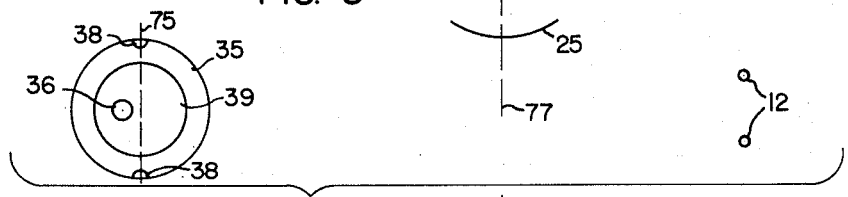
Figure 7:
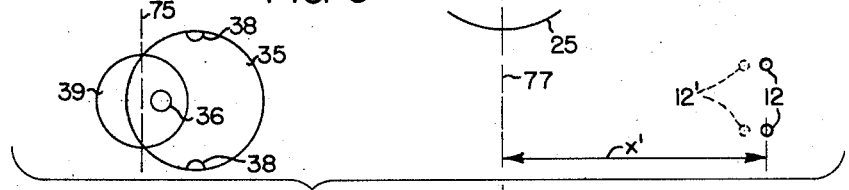

The way in which the length of the claw arm between the pivot 36 and follower 24, that is, the way in which the length of stroke of the claw arm may be adjusted, is illustrated diagrammatically in FIGS. 5 to 7 inclusive. FIG. 5 shows the normal positions of the parts, with a vertical plane 75 passing through the center of the disc 39 at a distance 76 from a vertical plane 77 passing through the axis 17' of the radial cam 18. X denotes the distance between plane 77 and the vertical plane of the claw pins 12. By moving the two eccentrics 35 and 39 together to the position shown in FIG. 6, for instance, a change in length of the claw arm between the pivot 36 and the plane 77 is accomplished without a change in position of the claw arm laterally. This allows for a change of stroke of the claw pins 12. By moving the pivot bushing 39 only, to rotate the pivot pin 36 to, for instance, the position shown in FIG. 7, a change of position of the claw arm horizontally is made without a change of stroke from that shown in FIG. 6. This adjustment moves the claw pins from the dotted line positions shown at 12' in FIG. 7 to the full line positions shown at 12, so that now there is a distance X' between the claw pins and the plane 77.

Figure 8:
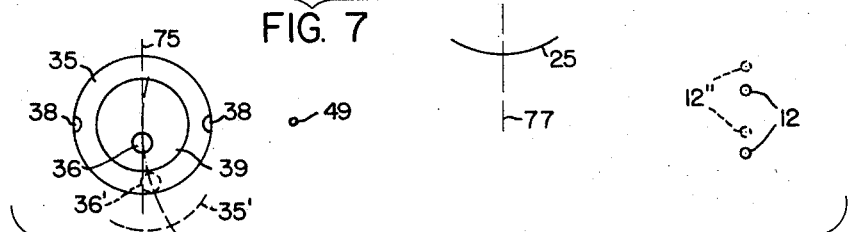

By rotating the framing rod 55, the framing arm is caused to rotate on the pivot 49 so that the parts may be rocked so that the pivot pin 36 and eccentric 35 will move, for instance, about the pivot 49 from the full line positions shown in FIG. 8 to the positions indicated in dotted lines at 36' and 35' in that figure. The result is to shift the claw pins vertically from the positions shown in dotted lines at 12'' to the positions shown in full lines at 12.

With the intermittent feeding mechanism of the present invention, therefore, it is possible quickly and easily to adjust the stroke of the claw arm, and to quickly and easily center a frame of the film in the optical aperture. Moreover, the adjustments can readily be effected by untrained personnel. Furthermore, the feeding mechanism itself is simple in construction, and may readily be manufactured by inexpensive machine tool operations.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. An intermittent feed mechanism for motion picture projectors and the like, comprising a support, a claw arm pivotally mounted adjacent one end on said support and having a claw pin adjacent its other end, and means including a disc mounted on said support, a pivot member connecting said disc and said claw arm for pivotally supporting said claw arm, said disc being rotatably adjustable on said support and relative to said claw arm for shifting the pivotal axis of said claw arm to adjust the distance between the pivotal axis of said arm and said claw.

2. An intermittent feed mechanism for motion picture projectors and the like, comprising a support, a first rotary disc mounted on said support for rotary adjustment about its axis and having a pivot stud projecting therefrom parallel to but offset from said axis, a claw arm having a claw pin mounted thereon adjacent one end of said arm, a second rotary disc mounted in said claw arm adjacent the other end thereof for rotary adjustment therein, said second disc having a hole through it eccentric of the axis of rotation of said second disc and in which said pivot stud fits.

3. An intermittent feed mechanism as claimed in claim 2, wherein said support is pivoted for adjustment about a separate longitudinal axis parallel to but offset from the axes of the two discs.

4. An intermittent feed mechanism for motion picture projectors and the like, comprising a support, a disc mounted on said support for rotary adjustment about its axis and having a pivot stud projecting therefrom parallel to but offset from said axis, a claw arm pivotally mounted adjacent one end on said stud, means for shifting said stud relative to said claw arm thereby to shift the pivotal axis of said arm, and means for effecting swinging movement of said claw arm about said pivot stud comprising a rotary cam, and a follower mounted intermediate the ends of said claw arm and engaging said cam, said disc being rotatable on said support to adjust the stroke of said arm independently of the adjustment of the first-named means.

5. An intermittent feed mechanism for motion picture projectors and the like, comprising a support, a two-part claw arm, means for hingedly connecting one end of one part of said arm to one end of the other part of said arm to mount said one part for swinging movement about a first axis in one plane, a claw pin carried adjacent the other end of said one part, means for pivotally mounting the other part of said claw arm adjacent its other end on said support for swinging movement about a second axis in a plane at right angles to the first-named plane, and means for effecting the two movements in timed relation comprising rotary cam means rotatable about a third axis and having two cam surfaces, and a pair of followers carried by said one part of said claw arm, one for engaging each of said surfaces, one of said cam surfaces being formed to impart intermittent swinging movement to said one part of said arm in said one plane, and the other of said cam surfaces being formed to impart intermittent swinging movement to the other part of said arm in the other plane said pivotal mounting means including means for shifting the pivotal axis of said arm to vary the distance between said second axis and said claw pin.

6. An intermittent feed mechanism as claimed in claim 5, wherein said pivotal mounting means further includes means for adjusting the distance between said second axis and said third axis.

7. An intermittent feed mechanism as claimed in claim 5 having an arm on which said pivotal mounting means is mounted, and means for supporting the last-named arm for pivotal adjustment about an axis parallel to but offset from said second axis.

8. In intermittent feed mechanism for motion picture projectors and the like, comprising a two-part claw arm, means for hingedly connecting one part of said claw arm at one end thereof to one end of the other part of said arm for swinging movement in one plane, a framing arm, a first disc rotatably adjustable on said framing arm, a pivot stud secured to said disc in offset relation to the axis of said disc to project from said disc in a direction parallel to the axis about which said disc is rotatably adjustable, a second disc rotatably adjustable on said other part of said claw arm and rotatable on said stud for supporting said claw arm pivotally on said stud for swinging movement in a plane perpendicular to said one plane, and means for effecting the two swinging movements comprising a rotary cam member having two cam surfaces, two followers carried by said claw arm to engage the two cam surfaces, respectively, one of said cam surfaces being constructed to impart swinging movement to said claw arm in said one plane generally axially of said cam, and the other of said cam surfaces being constructed to impart swinging movement to said claw arm in the second-named plane generally radially of the axis of said cam member.

9. An intermittent feed mechanism as claimed in claim 8, wherein means is provided for pivotally adjusting said framing arm about an axis offset from but parallel to the axes of adjustment fo the two discs.

10. An intermittent feed mechanism as claimed in claim 9, having relatively stationary means for limiting the swinging movement of said framing arm, stop means on said framing arm for limiting swinging movement of said claw arm in said second-named plane, spring means connecting the two parts of said claw arm for constantly urging said claw arm about its hinge means to hold one of said followers in engagement with said one cam surface, and spring means connecting said claw arm and said framing arm for holding the other follower in engagement with said other cam surface.

References Cited in the file of this patent

UNITED STATES PATENTS

| | | |
|---|---|---|
| 2,015,528 | Larson | Sept. 24, 1935 |
| 2,106,115 | Debrie | Jan. 18, 1938 |
| 2,335,435 | Morgan et al. | Nov. 30, 1943 |
| 2,484,348 | Kellogg et al. | Oct. 11, 1949 |
| 2,489,829 | Stechbart | Nov. 29, 1949 |
| 2,521,957 | Wittel et al. | Sept. 12, 1950 |
| 2,793,562 | Grenzig | May 28, 1957 |
| 2,893,287 | Lunzer | July 7, 1959 |